(12) United States Patent
Sigl et al.

(10) Patent No.: US 10,875,118 B2
(45) Date of Patent: Dec. 29, 2020

(54) ENGINE DRIVEN GENERATOR FOR PROVIDING WELDING POWER

(71) Applicant: Illinois Tool Works Inc., Glenview, IL (US)

(72) Inventors: Dennis R Sigl, Greenville, WI (US); Todd G. Batzler, Hortonville, WI (US); Michael D. Madsen, Freemont, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 280 days.

(21) Appl. No.: 15/810,921

(22) Filed: Nov. 13, 2017

(65) Prior Publication Data
US 2019/0143438 A1    May 16, 2019

(51) Int. Cl.
*B23K 9/10* (2006.01)

(52) U.S. Cl.
CPC .......... *B23K 9/1006* (2013.01); *B23K 9/1043* (2013.01)

(58) Field of Classification Search
CPC ............................ B23K 9/1006; B23K 9/1043
See application file for complete search history.

(56) References Cited

U.S. PATENT DOCUMENTS

| | | | | |
|---|---|---|---|---|
| 3,204,173 A | * | 8/1965 | Jackson ............... | B23K 9/1006 322/28 |
| 3,649,903 A | * | 3/1972 | Fiedler ................. | B23K 9/1006 322/27 |
| 3,828,754 A | * | 8/1974 | Carlsson ................... | F02P 1/02 123/149 D |
| 4,959,595 A | * | 9/1990 | Nishimura .............. | F02N 11/04 290/46 |

(Continued)

FOREIGN PATENT DOCUMENTS

| EP | 3216550 | 9/2017 |
|---|---|---|
| WO | 2016141149 | 9/2016 |

OTHER PUBLICATIONS

Communicaton related to the results of the partial Int'l Search Report Appln No. PCT/US2018/060703 dated Mar. 25, 2019.

(Continued)

*Primary Examiner* — Donnell A Long
(74) *Attorney, Agent, or Firm* — McAndrews, Held & Malloy, Ltd.

(57) ABSTRACT

A method and apparatus for providing engine driven welding-type power supply includes an engine, a generator, an input power circuit, a welding-type power circuit, an auxiliary power circuit and a controller. The generator includes permanent magnets that create and provides a generator output from at least one polyphase winding. The input power circuit is connected to the generator output and the welding-type power circuit is connected to the input circuit, and (Continued)

provides a welding-type output. The auxiliary power circuit is connected to the input circuit and provides an auxiliary power output. The controller is connected to the auxiliary power and the welding type power circuits, and can command that there be no load for the generator. The generator is connected to the engine and connected to function as a flywheel to the engine and the engine does not include a flywheel other than the generator.

8 Claims, 6 Drawing Sheets

(56) References Cited

U.S. PATENT DOCUMENTS

| | | | | |
|---|---|---|---|---|
| 5,642,260 A * | 6/1997 | Sigl | ............... | B23K 9/32 |
| | | | | 174/16.1 |
| 5,861,604 A * | 1/1999 | McLean | ............... | B23K 9/0671 |
| | | | | 219/130.4 |
| 6,982,398 B2 | 1/2006 | Albrecht | | |
| 6,987,242 B2 | 1/2006 | Geissler | | |
| 2004/0090136 A1* | 5/2004 | Uemura | ............... | H02K 21/222 |
| | | | | 310/156.26 |
| 2004/0182846 A1* | 9/2004 | Silvestro | ............... | B23K 9/1006 |
| | | | | 219/133 |
| 2005/0046191 A1* | 3/2005 | Cole | ............... | H02K 1/2786 |
| | | | | 290/1 A |
| 2005/0263514 A1* | 12/2005 | Albrecht | ............... | B23K 9/1006 |
| | | | | 219/133 |
| 2006/0037953 A1* | 2/2006 | Matthews | ............ | B23K 9/1006 |
| | | | | 219/133 |
| 2009/0101630 A1* | 4/2009 | Trinkner | ............... | B23K 9/1006 |
| | | | | 219/133 |
| 2014/0001167 A1* | 1/2014 | Bunker | ............... | B23K 9/1043 |
| | | | | 219/130.21 |
| 2014/0246412 A1* | 9/2014 | Delisio | ............... | B23K 9/1075 |
| | | | | 219/133 |
| 2014/0374394 A1* | 12/2014 | Sigl | ............... | H01L 23/4093 |
| | | | | 219/130.1 |
| 2014/0376186 A1* | 12/2014 | Sigl | ............... | B23K 9/32 |
| | | | | 361/695 |
| 2015/0336197 A1* | 11/2015 | DeLisio | ............... | B23K 9/1006 |
| | | | | 219/133 |
| 2016/0098051 A1* | 4/2016 | Enyedy | ............... | G05F 1/625 |
| | | | | 307/52 |
| 2016/0256950 A1* | 9/2016 | Madsen | ............... | B23K 9/095 |
| 2017/0259368 A1* | 9/2017 | Enyedy | ............... | B23K 9/1006 |
| 2018/0079023 A1* | 3/2018 | Enyedy | ............... | B23K 9/1012 |

OTHER PUBLICATIONS

Int'l Search Report and Written Opinion Appln. No. PCT/US2018/060703 dated May 31, 2019.

* cited by examiner

ENGINE DRIVEN GENERATOR FOR PROVIDING WELDING POWER

FIELD OF THE INVENTION

The present disclosure relates generally to the art of welding type power supplies that include a welding type power circuit that receives power from an engine driven generator.

BACKGROUND OF THE INVENTION

There are many known types of welding-type power supplies. Welding-type power, as used herein, refers to power suitable for electric arc welding, plasma cutting or induction heating. Welding-type systems are often used in a variety of applications and often are used at sites where utility power is not available or insufficient. In such applications welding type systems include, or receive power from, an engine driven generator. Welding-type system, as used herein, is a system that can provide welding type power, and can include control and power circuitry, wire feeders, and ancillary equipment, and/or an engine and generator.

Engine driven generators that are part of welding systems are designed with numerous considerations. First, they often attempt to mimic utility power because the welding power supply portion of the system is often designed to be used with either utility or engine power. Second, they often use a field coil and select the number of poles and rotational frequency to produce 60 (or 50) Hz current. Third, the engine must be cooled and the generator must be cooled. Fourth, the engine has a flywheel. Fifth, the engine shaft must turn the generator rotor (and the shaft must be supported to do so). Taking all of these factors into consideration can lead to engines that operate less efficiently than desired, and/or are more costly than desired Prior art welding systems with an engine need a way to cool the engine and generator power supply. Typically a fan for cooling just the generator is provided. This fan adds cost and weight to the system, and reduces overall efficiency of the system.

Prior art welding systems with a generator typically include a shaft driven by the engine that extends to the generator. Such shafts are typically supported at multiple locations, such as at each end. Each support adds weight and cost to the system.

Prior art welding systems with an engine and generator typically provide a flywheel as part of the engine. The flywheel is necessary, but having a flywheel that is used solely as an engine flywheel adds cost and weight to the system, and reduces overall efficiency of the system.

Prior art welding systems typically use a field coil and select the number of poles and rotational frequency to produce 60 (or 50) Hz current. This forces the number of poles to be chosen based on the output frequency desired, rather than allowing the generator to be designed in as efficient and cost effective manner as possible.

Prior art welding-type systems often provide auxiliary power outputs to power tools, etc. Auxiliary output power, as used herein includes, power provided to mimic utility power, such as 50/60 Hz, 120/240/200V, e.g., that can be used to power devices such as tools, lights, etc. U.S. Pat. No. 6,987,242 describes system where auxiliary power is derived using an inverter that creates a 575V signal that is stepped down by an isolation transformer to an aux power signal. Prior art aux power can be single phase or split phase (two single phase outputs).

Accordingly, a welding-type system that has a poly phase generator without multiple windings, and/or is able to cool the generator without a dedicated cooling fan, and/or does not need a dedicated flywheel for the engine, and/or uses a single support for the generator shaft, and/or does not need to have the number of poles tied to the frequency of the output is desirable.

SUMMARY OF THE PRESENT INVENTION

According to a first aspect of the disclosure an engine driven welding-type power supply includes an engine, a generator, an input power circuit, a welding-type power circuit, an auxiliary power circuit and a controller. The generator is connected to the engine, and provides a generator output from at least one polyphase winding, thus the generator output has more than one phase. The input power circuit is connected to the generator output and the welding-type power circuit is connected to the input circuit, and provides a welding-type output. The auxiliary power circuit is also connected to the input circuit, and provides an auxiliary power output. The controller is connected to the auxiliary power circuit and the welding type power circuit.

According to a second aspect of the disclosure an engine driven welding-type power supply includes an engine, a generator, an input power circuit, a welding-type power circuit, an auxiliary power circuit and a controller. The engine drives the generator, and the generator includes a plurality of permanent magnets that create an excitation field, and the generator provides a generator output. The input power circuit is connected to the generator output, and the welding-type power circuit is connected to the input circuit to provide a welding-type output. The auxiliary power circuit is also connected to the input circuit, and provides an auxiliary power output. The controller is connected to the auxiliary power circuit and the welding type power circuit.

According to a third aspect of the disclosure an engine driven welding-type power supply includes an engine, a generator, an input power circuit, a welding-type power circuit, an auxiliary power circuit and a controller. The generator is connected to the engine and connected to function as a flywheel to the engine. The engine does not include a flywheel other than the generator. The welding-type power circuit is connected to the input circuit and provides a welding-type output. The auxiliary power circuit is connected to the input circuit to provide an auxiliary power output. The controller is connected to the auxiliary power circuit and the welding type power circuit.

The controller can command that there be no load for the generator, such as by having a no load module, in one embodiment.

The generator includes a plurality of permanent magnets that creates an excitation field in one alternative.

The engine includes an air intake and an air flow path that receives air from the air intake, and the generator is located in the air flow path in another alternative.

The generator is connected to function as a flywheel to the engine, and the engine does not include a flywheel other than the generator in one embodiment.

The generator includes a rotor and the engine includes a shaft that rotates the rotor, and the rotor is cantilevered at an end of the shaft in various embodiments.

The engine shaft is supported only by bearings in the engine and not by a bearing in the generator.

The polyphase winding is a three phase winding in another alternative.

The polyphase winding is arranged in a Y connection and the auxiliary output is a split phase auxiliary output in one embodiment.

Other principal features and advantages of will become apparent to those skilled in the art upon review of the following drawings, the detailed description and the appended claims.

Figure 1:
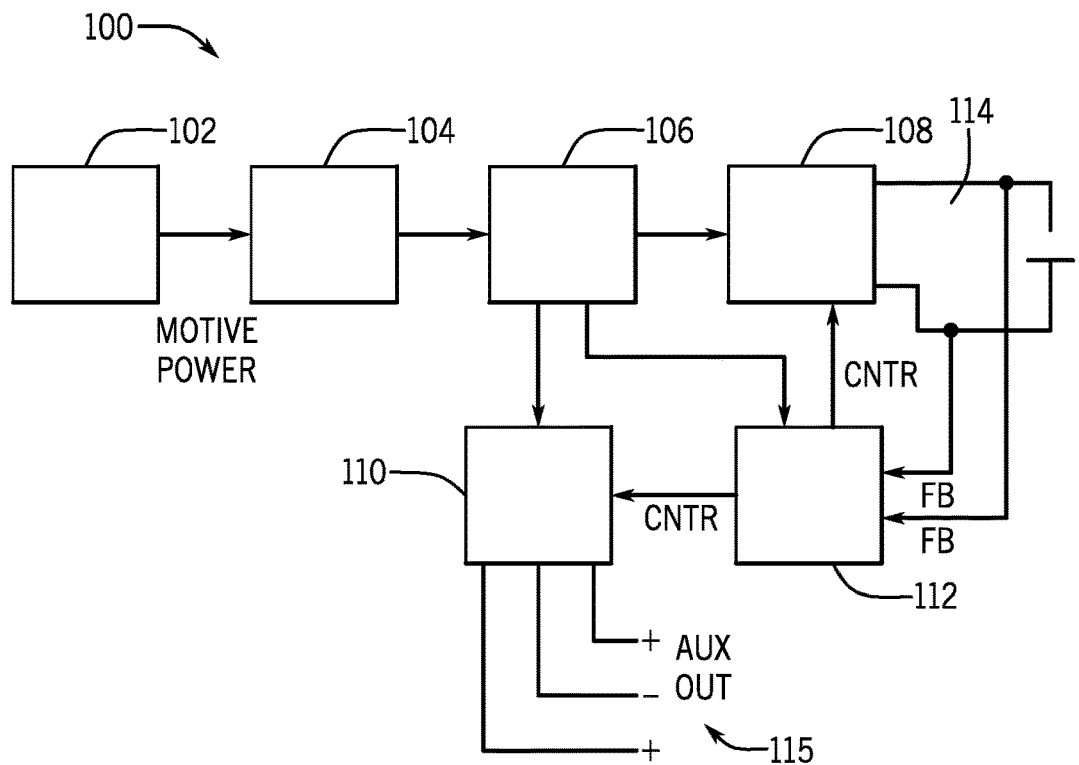
FIG. 1 is a block diagram of an engine driven welding-type power supply in accordance with this disclosure.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular implementation with particular components, it should be understood at the outset that the engine driven generator for producing welding type power can also be implemented with other components and designs.

The preferred embodiment is directed to an engine driven welding-type power supply that includes an engine, a generator, an input power circuit, a welding-type power circuit, an auxiliary power circuit and a controller that cooperate to provide welding type power. Welding type power, as used herein, refers to welding, plasma cutting, induction heating, CAC-A and/or hot wire welding/preheating (including laser welding and laser cladding) power. Welding-type power supply, as used herein, includes any device capable of supplying welding, plasma cutting, induction heating, CAC-A and/or hot wire welding/preheating (including laser welding and laser cladding) power, including resonant power supplies, quasi-resonant power supplies, etc., as well as control circuitry and other ancillary circuitry associated therewith.

The generator is connected to the engine, and a shaft in the engine turns a rotor in the generator. The rotor is preferably cantilevered at an end of the shaft, although it is not in various embodiments. The engine shaft is preferably supported only by bearings within the engine and not by bearings in the generator in one alternative. The engine preferably includes an air intake and an air flow path that receives air from the air intake, and the generator is located in the air flow path in another alternative.

The generator preferably includes a plurality of permanent magnets that create an excitation field. The generator provides a generator output from at least one polyphase winding in one embodiment, thus the generator output has more than one phase. The polyphase winding is preferably a three phase winding arranged in a Y connection. The generator preferably functions as a flywheel to the engine, and the engine does not include a flywheel other than the generator. Flywheel to the engine, as used herein, refers to a flywheel that stores mechanical energy produced by the engine. The flywheel also may serve as an air mover, the rotor for the engine's charging circuit, or the rotor of the main power generator, or any combination thereof.

The input power circuit is connected to the generator output and may be an input circuit such as that found in the prior art. Preferably the input circuit is a preregulator, but can be a simple rectifier and/or filter in various embodiments. Input circuit, as used herein, includes circuits configured to receive an ac input signal and to provide a dc output signal and may include as part thereof a rectifier, a transformer, a saturable reactor, a converter, an inverter, a filter, and/or a magnetic amplifier The welding-type power circuit (or welding type power output circuit) is connected to the input circuit, and provides welding-type output power. The welding type power circuit can be any topology, but is preferably a switched mode power circuit. Welding-type output power circuit, as used herein includes, the circuitry used to deliver welding-type power to the output studs. Welding type output power, as used herein, refers to output power suitable for welding, plasma cutting, induction heating, CAC-A and/or hot wire welding/preheating (including laser welding and laser cladding).

The auxiliary power circuit is also connected to the input circuit, and provides an auxiliary power output. Preferably, the auxiliary output is a split phase auxiliary output. The auxiliary power can be any topology, but preferably includes an inverter to produce synthetic aux power. Auxiliary power circuit, as used herein, includes, circuitry used to provide auxiliary output power. Auxiliary output power, as used herein includes, power provided to mimic utility power, such as 50/60 Hz, 120/240/200V, e.g., that can be used to power devices such as tools, lights, etc.

The controller is connected to the auxiliary power circuit and the welding type power circuit, and provides control signals to the switches in the auxiliary power circuit and the welding type power circuit. The controller can command that there be no load for the generator at start up or when the engine needs to increase speed. This allows the engine to more quickly increase its power output because there is not a drag on the engine and/or the engine is not snubbed. This embodiment is particularly suited for use with a permanent magnet because there's no way to "shut off the field" in a permanent magnet. Alternatives providing for reducing the load to a smaller amount, rather than commanding it to zero. Energy for the aux load or welding load can be derived from a storage device such as batteries or electrolytic capacitors, or the load can simply be delayed until the engine is up to speed. The load for the generator is preferably commanded to zero by a no load module, which is part of the controller. No load module, as used herein, is a module that commands the load for the generator to be zero when it would be more than zero absent the no load module, and does so in response to actual or desired changes in engine speed or engine starting. Alternatively, the load for the generator is reduced using a reduced load module, which is part of the controller. Reduced load module, as used herein, is a module that commands the load for the generator to be reduced to less than it would be absent the reduced load module, and does so in response to actual or desired changes in engine speed or engine starting. No load for the generator, as used herein, refers to no welding type power and no auxiliary power being drawn from the generator. Controller, as used herein, includes digital and analog circuitry, discrete or integrated circuitry, microprocessors, DSPs, FPGAs, etc., and software, hardware and firmware, located on one or more boards, used to control all or part of a welding-type system or a device such as a power supply, power source, engine or generator.

Turning now to FIG. 1 a block diagram of an engine driven welding-type power supply 100 includes an engine 102, a generator 104, an input power circuit 106, a welding-type power circuit 108, an auxiliary power circuit 110 and a controller 112. Engine 102 provides motive power to generator 104. Generator 104 generates electrical power and provides that power to input circuit 106. Input circuit 106 preferably preregulates the power for generator 104 to provide a relatively high voltage bus (880V e.g.) to welding-type power circuit 108 and auxiliary power circuit 110. Circuits 108 and 110 are preferably switch mode power supplies and the switches thereon are controlled by controller 112 to provide a welding power output 114 from welding-type power circuit 108 and a split phase aux power output 115 output from auxiliary power circuit 110.

Controller 112 also receives control power from input circuit 106, which is used to power the control circuitry of controller 112. Feedback may be provided from the welding output, the aux output, and/or early stages.

Figure 2:
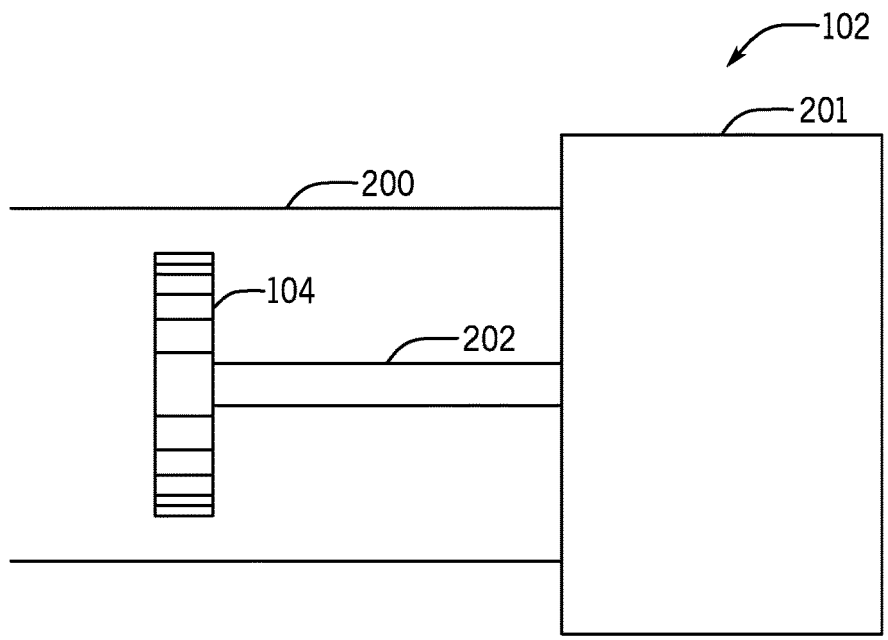
FIG. 2 is a diagram of engine and generator in accordance with this disclosure.

Engine 102 and generator 104 may be a conventional engine and generator found in prior art welding type systems, except as described herein. Engine 102 includes an air flow path 200 (FIG. 2) that receives air from the air intake. Generator 104 is preferably located in air flow path 200. Airflow is provided to the engine by a single fan, and that airflow can cool the engine and the generator. A separate fan to cool the generator is not needed when the generator is in the air flow path Generator 104 is mounted on a shaft 202 and connected to serve as a flywheel to engine 102, and engine 102 does not include a flywheel. Block 201 represents the reminder of engine 102, which can be consistent with the prior art, except for the absence of a fly wheel other than generator 104 and as otherwise discussed.

Figure 3:
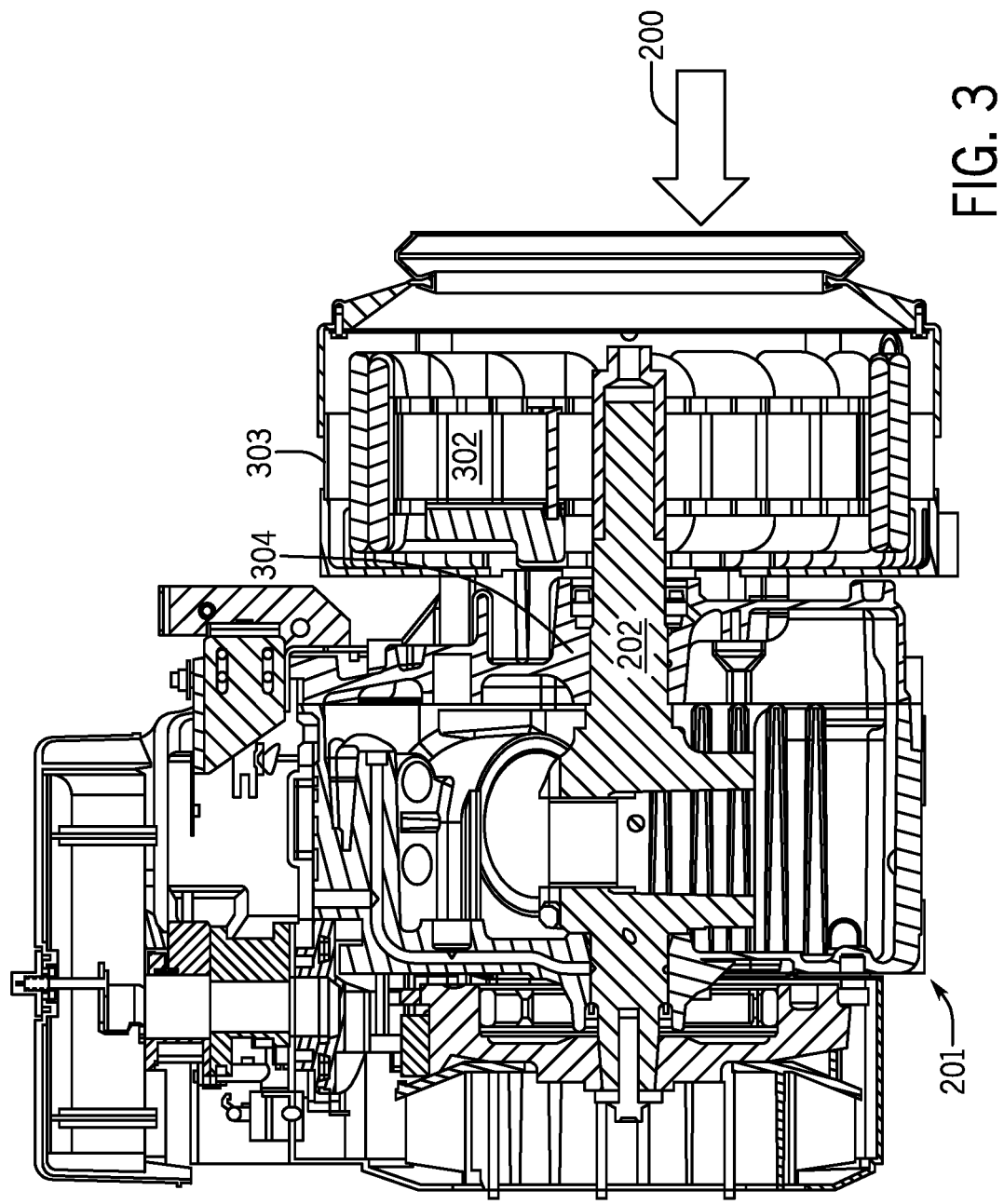
FIG. 3 is a diagram of engine and generator in accordance with this disclosure.
Figure 4:
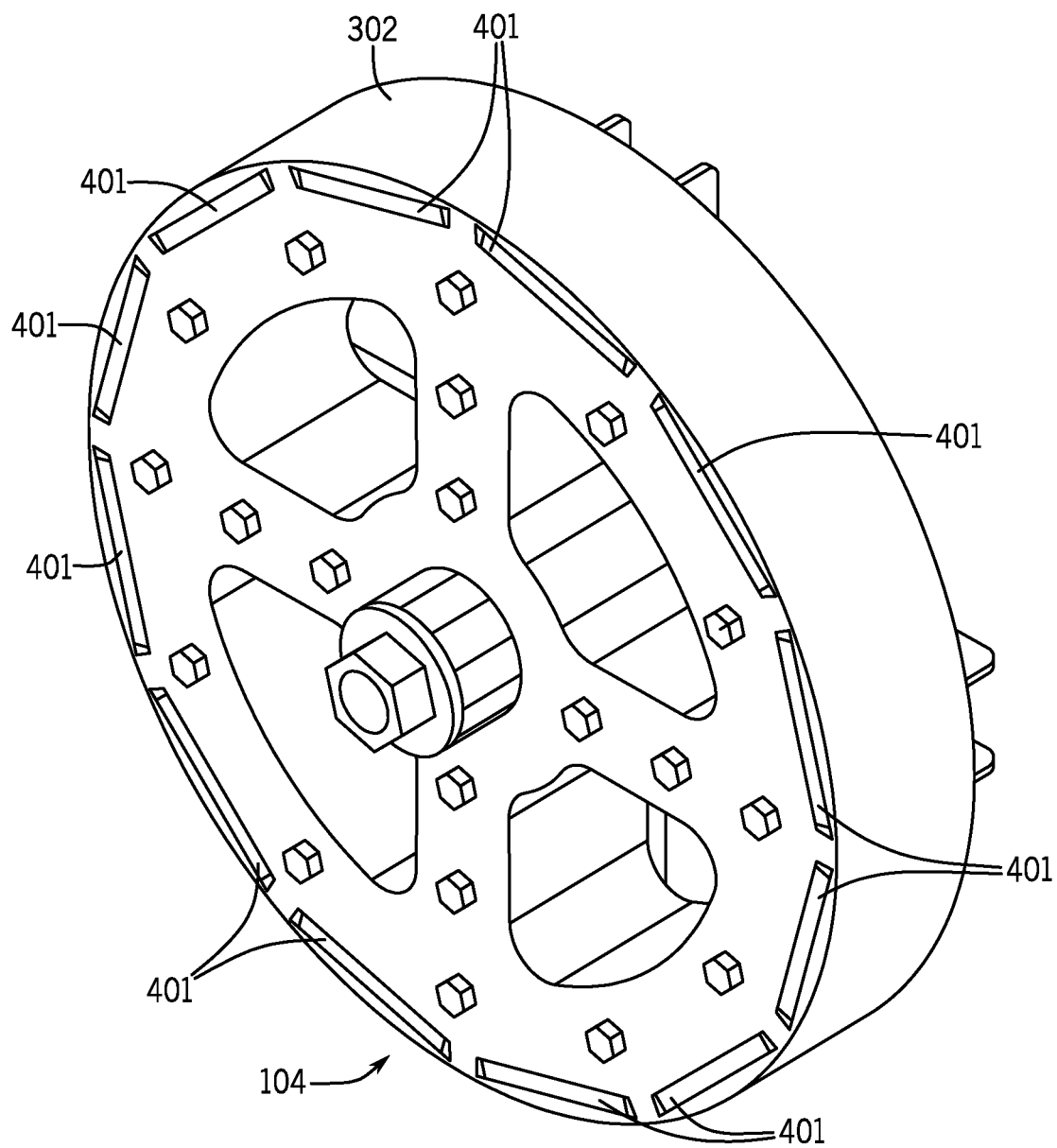
FIG. 4 is a diagram of part of a generator in accordance with this disclosure.
Figure 5:
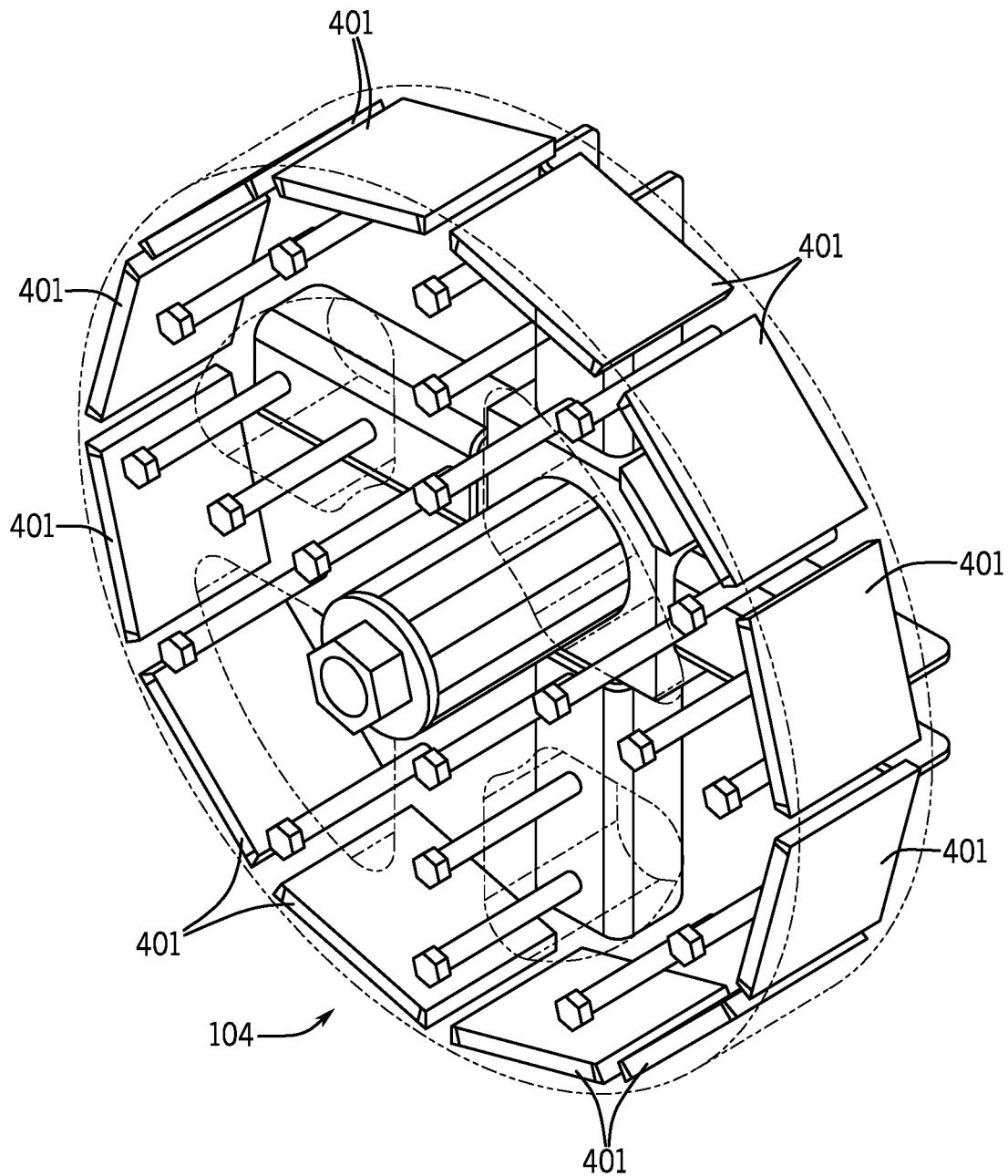
FIG. 5 is a diagram of part of a generator in accordance with this disclosure.

Referring now to FIG. 3 generator 104 includes a rotor 302 and a stator 303. Rotor 302 is mounted on shaft 202. Preferably rotor 302 is mounted near the end of shaft 202 and is cantilevered. Also, shaft 202 is supported by bearings 304 within engine 102, and not by bearings within generator 104. Generator 104 is shown in more detail in FIGS. 4 and 5, and preferably includes permanent magnets 401 that create an excitation field. from a polyphase winding. FIG. 5 shows permanent magnets 401 with rotor 302 transparent.

Figure 6:
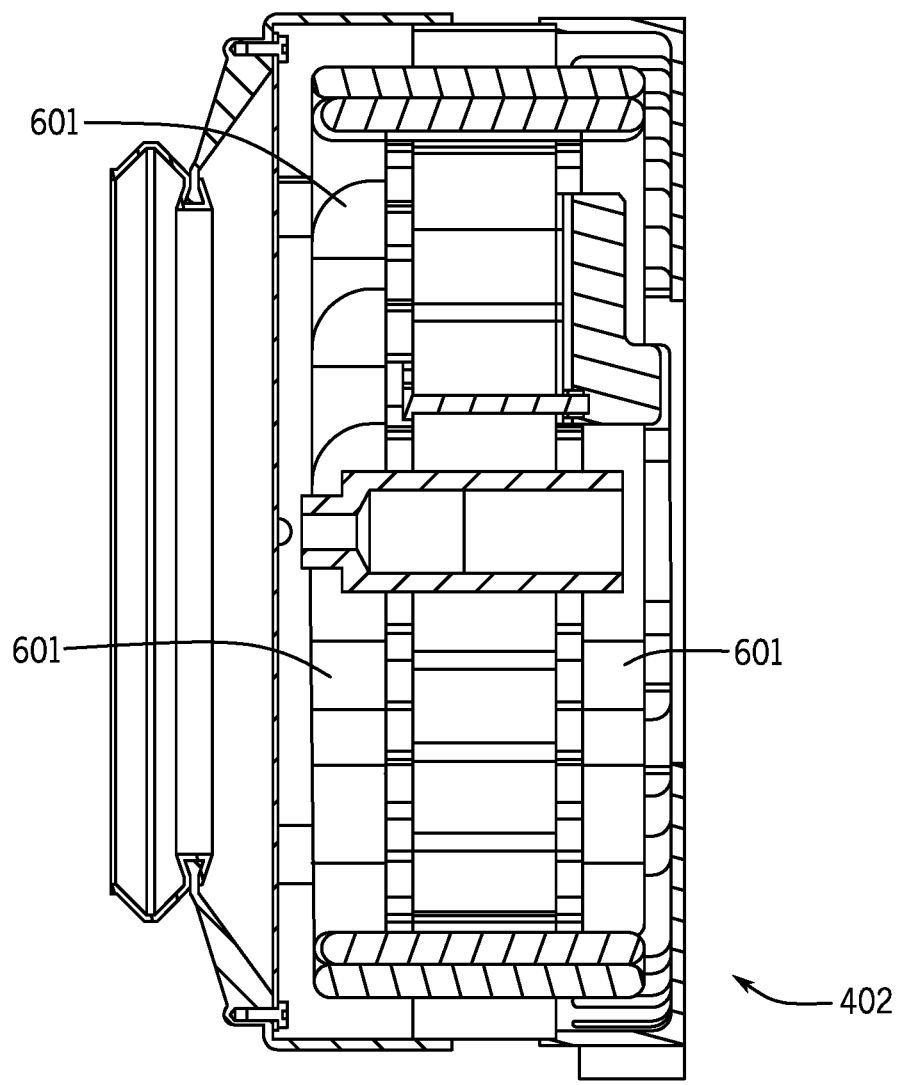
FIG. 6 is a diagram of part of a generator in accordance with this disclosure.
Figure 7:
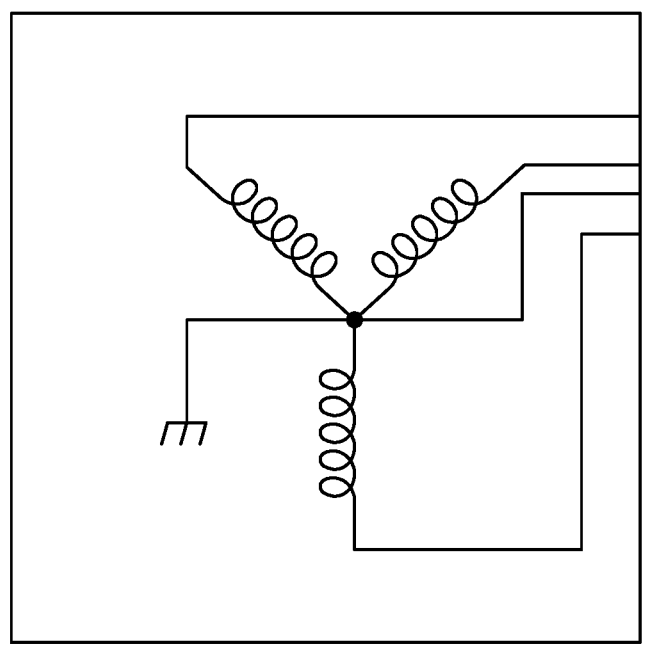
FIG. 7 is a diagram of windings of a generator in accordance with this disclosure.

Referring now to FIG. 6, a cut away view of generator 104 shows a single polyphase winding 601. Poly phase winding 601 is a three phase winding in the preferred embodiment. Referring now to FIG. 7, polyphase winding 601 is arranged in a grounded WYE connection.

Thus, it should be apparent that there has been provided a method and apparatus for providing welding type power with an engine and generator that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. An engine driven welding-type power supply, comprising:
   an engine;
   a generator, connected to the engine, and configured to provide a generator output, wherein the generator includes exactly one polyphase winding and a plurality of permanent magnets that create an excitation field, wherein the generator output has more than one phase and the generator output is derived from the polyphase winding;
   an input power circuit connected to the generator output and configured to preregulate power from the generator output to a high voltage bus;
   a welding-type power circuit, connected to the input circuit, and configured to provide a welding-type output;
   an auxiliary power circuit connected to the input circuit, and configured to provide an auxiliary power output; and
   a controller connected to the auxiliary power circuit and the welding-type power circuit.

2. The welding-type power supply of claim 1, wherein the controller includes a no load module having an output connected to the welding-type power circuit and the auxiliary power circuit.

3. The welding-type power supply of claim 1, wherein the engine includes an air intake and an air flow path that receives air from the air intake, and wherein the generator is located in the air flow path.

4. The welding-type power supply of claim 1, wherein the generator is connected to function as a flywheel to the engine, and further wherein the engine does not include a flywheel other than the generator.

5. The welding-type power supply of claim 1, wherein the generator includes a rotor and the engine includes a shaft that rotates the rotor, and wherein the rotor is near a first end of the shaft, and wherein the first end of the shaft is cantilevered.

6. The welding-type power supply of claim 5, wherein shaft is supported by at least one bearing within the engine and is not supported by a bearing within the generator.

7. The welding-type power supply of claim 1, wherein the at least one polyphase winding is a three phase winding.

8. The welding-type power supply of claim 1, wherein the at least one polyphase winding is arranged in a Y connection and the auxiliary output is a split phase auxiliary output.

\* \* \* \* \*